Patented Aug. 18, 1942

2,293,254

UNITED STATES PATENT OFFICE 2,293,254

DYESTUFFS OF THE ANTHRAQUINONE SERIES

Donald P. Graham, Wilmington, Del., assignor to E. I. du Pont de Nemours & Company, Wilmington, Del., a corporation of Delaware No Drawing. Application May 27, 1941, Serial No. 395,393

3 Claims. (Cl. 260—274)

This invention relates to the preparation of new dyestuffs of the anthraquinone series. The object of the invention is to prepare new dyestuffs of the benzanthrone acridine type which dye cotton in fast gray to black shades.

I have found that new and valuable gray to black dyestuffs which exhibit excellent fastness properties may be produced by condensing a dihalogen-Bz-1:Bz-1'-dibenzanthronyl with two molecular proportions of 1,5-diaminoanthraquinone and with or without isolation further condensing the resulting product with two molecular proportions of Bz-1-bromo-benzanthrone. The resulting anthrimide type compound is isolated by filtering, extracting with dilute sulfuric acid, again filtering then washing and drying. This product is then fused with alcoholic caustic potash to effect the ring closure of the dibenzanthrone nucleus and to effect a ring closure of the acridine and carbazole rings between the 1,5-diaminoanthraquinone nuclei, the benzanthrone and the dibenzanthrone molecules. The resulting product is acid pasted with sulfuric acid in the usual manner to give the vat dyestuff which dyes in gray to black shades. These condensations above mentioned are effected by the well known Ullmann reactions in a high boiling solvent such as nitrobenzene or naphthalene.

The dihalogen-Bz-1:Bz-1'-dibenzanthronyl employed may be prepared by condensing a monochloro-anthraquinone with acrolein by the known methods to give the corresponding chlorobenzanthrones which are in turn subjected to mild oxidation with manganese dioxide in sulfuric acid, according to known procedure, to give the corresponding isomeric mixture of dichloro-Bz-1:Bz-1'-dibenzanthronyls. The exact character of the dye obtained depends on whether the alpha or beta chloroanthraquinone is employed as the starting material. It is generally assumed that the 1-chloro-anthraquinone when condensed with acrolein to give benzanthrone results in a mixture of the 4,5-, and 8-chlorobenzanthrones which will be referred to broadly as alpha-chlorobenzanthrone. The 2-chloroanthraquinone gives what is generally considered to be a mixture of the 2,3,6, and 7-chloro-benzanthrones which will be referred to as the beta-chlorobenzanthrone. In the case of the beta-chloro-benzanthrone the 2-chloro-benzanthrone present does not form the dibenzanthronyl and is removed after the oxidation by extraction with a solvent such as mono-chlorobenzene.

The invention also contemplates the condensation in the same manner, of the dibromo, and the dinitro-Bz-1:Bz-1'-dibenzanthronyls which may be prepared by direct dibromination or dinitration of the Bz-1:Bz-1'-dibenzanthronyl. The invention also contemplates the use of the known 3, 4, 5, 6, 7 or 8-chloro-benzanthrones as the starting material. These gray to black dyes may also be produced by the condensation of the chlorobenzanthrone with one molecule of 1,5-diamino-anthraquinone followed by condensation of the resulting product with one molecule of Bz-1-bromo-benzanthrone. The condensation product is then fused with alcoholic caustic.

The following examples are given to illustrate the invention. The parts used are by weight.

Example 1

200 parts of alpha-chlorobenzanthrone (prepared by condensing 1-chloroanthraquinone with acrolein in sulfuric acid in the usual manner) is dissolved in 4000 parts of 93% sulfuric acid at 20–25° C. 370 parts of water are added slowly with cooling at 25 to 40° C. The charge is then cooled to 8° C. and 160 parts of $MnO_2$ (85%) are added during 6 hours at 8 to 10° C. After the $MnO_2$ has been added, the charge is stirred at 8 to 10° C. for at least 5 hours longer or until a test shows no more benzanthrone to be present. (When a drop of the charge is dissolved in 15 cc. 96% sulfuric acid, benzanthrone is detected by a yellow fluorescence.) When complete, drown to from 15 to 20% sulfuric acid in water containing 160 parts of sodium bisulfite. Heat to a boil and dilute to from 5 to 10% sulfuric acid with cold water. Filter, wash the cake acid free, and dry.

53 parts of alpha-dichloro-Bz-1:Bz-1'-dibenzanthronyl as above obtained and 47 parts of 1:5-diaminoanthraquinone are slurried in 1000 parts of molten naphthalene with 35 parts of potassium carbonate, 35 parts of potassium acetate, 3.5 parts of copper acetate and 0.35 part of copper powder. The charge is heated to from 212 to 215° C. for from 2 to 5 hours and cooled to from 180 to 190° C. 62 parts of Bz-1-bromobenzanthrone are added at this point and the charge is heated again to from 212 to 215° C., this time for 10 to 15 hours. It is then cooled to 140° C. and diluted with 1000 parts of solvent naphtha. The charge is filtered at 100° C. and the cake washed with solvent naphtha followed by alcohol (or steamed until free of naphthalene). The cake is extracted with dilute HCl, filtered, washed acid free, and dried. The resulting intermediate is a dark colored solid dissolving in concentrated sulfuric acid with a Bordeaux red color. It is almost insoluble in alkaline hydrosulfite.

150 parts of methanol and 450 parts of potassium hydroxide are heated together to 190° C. (allowing some of the methanol to distill off during heating). The melt is cooled to 180° C. and 75 parts of the anthrimide product, prepared as described above, are added. The charge is then heated during 2 hours to 200° C. and held one hour at 200 to 210° C. When completed, it is drowned in 3000 parts of cold water, heated to the boil and stirred in contact with the air at 90° C. to 100° C. until the color is completely precipitated by oxidation. It is then filtered off, washed free of alkali, and dried. The crude color is a dark colored solid which dissolves in concentrated sulfuric acid with a green solution and in alkaline hydrosulfite solution with a reddish blue to black color from which vat cotton is dyed in gray to black shades.

1 part of the above color is ground to pass an 80 mesh screen and slurried in 20 parts of 96% sulfuric acid at 4 to 7° C. for from 3 to 5 hours or until all lumps have been dispersed. The charge is then drowned in from 100 to 150 parts of ice water and the resulting slurry is filtered. The cake is washed acid free and pasted in the usual manner. The product is not only improved in physical form but also in solubility in the vat (as is characteristic of the benzanthrone acridine types). Otherwise the properties of the acid pasted product (in the dry form) are essentially similar to those of the crude fusion product.

*Example 2*

2-chloroanthraquinone is condensed with acrolein in sulfuric acid in the usual manner to give a mixture of isomeric beta-chlorobenzanthrones. This mixture is oxidized as described in the preceding example to give the corresponding beta-dichloro-Bz-1:Bz-1'-dibenzanthronyls. However, the 2-chloro-benzanthrone does not enter into this reaction and is removed after oxidation by extraction with mono-chlorobenzene. The extraction may be considered complete when the residue no longer shows a yellow fluorescence in sulfuric acid.

The condensations with 1,5-diaminanthraquinone and then with Bz-1-bromo-benzanthrone are carried out as described in the preceding example using the beta-dichloro-Bz-1:Bz-1'-dibenzanthronyl instead of the alpha isomers. The properties of the resulting product are essentially similar to those of the product obtained from the alpha-dichloro-Bz-1:Bz-1'-dibenzanthronyl.

500 parts of potassium hydroxide and 300 parts of ethyl alcohol are heated together to 180° C. allowing some of the alcohol to distill off during the heating. The melt is then cooled to 175° C. and 50 parts of the anthrimide product as above prepared are added. The mass is then heated during 2 hours to 200° and held at 200 to 210° for one hour. When the reaction is completed, the charge is drowned, aerated, and the dye is isolated, and acid pasted as described in the preceding example. The properties of the finished dyestuff are closely similar to those of the mixture of alpha-isomers described in Example 1.

*Example 3*

360 parts of Bz-1:Bz-1'-dibenzanthronyl are slurried in 2160 parts of nitrobenzene. The slurry is heated to from 140 to 150° C. for one hour (for dehydration) and then cooled to 80° C. 7 parts of iodine are added followed by a mixture of 140 parts of bromine and 117 parts of sulfuryl chloride which is added at 80 to 85° C. during a period of from 15 to 20 hours. The charge is stirred at from 80 to 85° C. for 15 hours longer, cooled to room temperature and filtered. The cake is washed with 180 parts of nitrobenzene, steamed until free of solvent, filtered, washed, and dried. 68 parts of this dibromo-Bz-1:Bz-1'-dibenzanthronyl are slurried in 1200 parts of nitrobenzene with 50 parts of 1:5-di-amino-anthraquinone, 60 parts of soda ash, 6 parts of copper acetate, and 0.6 part of copper powder. The charge is heated to from 200 to 210° C. for 2 to 4 hours, cooled to 190° C. and 65 parts of Bz-1-bromobenzanthrone are added. The mass is again heated to from 200 to 210° C. and stirred at this temperature for from 12 to 16 hours, cooled to 80° C. and filtered. The cake is washed with a small quantity of nitrobenzene, steamed until free of solvent, extracted with dilute HCl, filtered, washed acid free and dried. The resulting anthrimide is essentially similar to those described in the preceding examples although it is probably structurally different from either of them, being isomeric therewith.

The above anthrimide product may be fused with alcoholic KOH and carried through to color as described in either of the preceding examples to give a vat dyestuff dissolving in concentrated sulfuric acid with a green color and dyeing cotton in fast gray to black shades from a Bordeaux blue to black vat. (The shade of this product is somewhat bluer than the blacks obtained by the procedures of Examples 1 and 2.)

*Example 4*

When an equimolecular quantity of dinitro-Bz-1:Bz-1'-dibenzanthronyl is substituted for the dibromo-Bz-1:Bz-1'-dibenzanthronyl in the synthesis described in Example 3, a black vat dyestuff is obtained which is generally similar but slightly greener in shade than those of Examples 1 and 2.

*Example 5*

12 parts of 1:5-diamino-anthraquinone are slurried in 240 parts of nitrobenzene with 15 parts of soda ash, 1.5 parts of copper acetate, and 0.15 part of copper powder and heated to from 200 to 210° C. 13 parts of alpha-chloro-benzanthrone are added during one hour and the charge stirred a few minutes longer at this temperature. 16 parts of Bz-1-bromobenzanthrone are then added during 10 to 15 minutes and the charge is stirred at 200 to 210° C. for 3 hours longer. At the end of this period, it is cooled to 80° C. and filtered. The cake is washed with nitrobenzene followed by alcohol; then it is extracted with dilute hydrochloric acid, filtered, washed acid free, and dried. The resulting anthrimide product is fused in alcoholic potassium hydroxide and pasted from sulfuric acid as described in the second example. The product is essentially the same as that obtained by the procedure outlined in the first example. Any non-vattable material present may be removed by a vat filtration if so desired.

The gray to black dyes of these examples show good fastness to washing, very good fastness to bleach (both chlorine and peroxide) and excellent light fastness. They are suitable for application to fibers by the usual vat dye printing processes as well as by the usual dyeing methods. They exhibit good tinctorial power and build up to black shades readily.

I claim:

1. The products obtained by the alcoholic caustic alkali fusion of the anthrimide type condensation derivatives produced by condensing one mole of a di-negatively substituted Bz-1, Bz-1'-dibenzanthronyl in which the negative substituents are of the class consisting of halogen and —NO₂, with two moles of 1,5-diaminoanthraquinone and then with two moles of Bz-1-bromobenzanthrone.

2. The alcoholic caustic fusion products of the anthrimide type condensation derivatives of one mole of beta-dihalogen-Bz-1:Bz-1'-dibenzanthronyl with two moles of 1,5-diaminoanthraquinone and then with two moles of Bz-1-bromobenzanthrone.

3. The alcoholic caustic fusion products of the anthrimide type condensation derivatives of one mole of alpha-dihalogen-Bz-1:Bz-1'-dibenzanthronyl with two moles of 1,5-diaminoanthraquinone and then with two moles of Bz-1-bromobenzanthrone.

DONALD P. GRAHAM.